United States Patent [19]

Welles

[11] Patent Number: 4,545,552
[45] Date of Patent: Oct. 8, 1985

[54] AIRFRAME DESIGN

[76] Inventor: Stanley W. Welles, 12980 Knight Ct., Broomfield, Colo. 80020

[21] Appl. No.: 505,831

[22] Filed: Jun. 20, 1983

[51] Int. Cl.⁴ ............................................. B64C 5/08
[52] U.S. Cl. .................................... 244/90 R; 244/91; 244/199
[58] Field of Search ................... 244/199, 45 R, 45 A, 244/46, 47, 36, 90 R, 91

[56] References Cited

U.S. PATENT DOCUMENTS

| | | | |
|---|---|---|---|
| D. 117,419 | 10/1939 | Munk et al. | 244/45 R |
| D. 143,847 | 2/1946 | Northrop | 244/45 R |
| D. 147,875 | 11/1947 | Shannon | 244/45 R |
| 2,397,526 | 4/1946 | Bonbright | 244/91 |
| 2,406,588 | 8/1946 | Cornelius | 244/45 R |
| 2,418,301 | 4/1947 | Heal | 244/91 |
| 2,565,990 | 8/1951 | Richard | 244/90 R |
| 2,576,981 | 12/1951 | Vogt | 244/199 |
| 2,846,165 | 8/1958 | Axelson | 244/90 R |
| 3,438,597 | 4/1969 | Kasper | 244/91 |
| 4,247,062 | 1/1981 | Brueckner | 244/91 |
| 4,247,063 | 1/1981 | Jenkins | 244/199 |
| 4,457,479 | 7/1984 | Daude | 244/91 |

FOREIGN PATENT DOCUMENTS

| | | | |
|---|---|---|---|
| 3133957 | 3/1983 | Fed. Rep. of Germany | 244/199 |
| 1204997 | 1/1960 | France | 244/91 |
| 454666 | 1/1950 | Italy | 244/91 |
| 545359 | 6/1956 | Italy | 244/199 |

OTHER PUBLICATIONS

*Gulfstreamer,* vol. 5, No. 6, Winter 1976, p. 9.

*Primary Examiner*—Trygve M. Blix
*Assistant Examiner*—Rodney Corl

[57] ABSTRACT

This invention relates to aircraft designs with substantial trim drag reduction while maintaining commercially feasible low parasitic and induced drag. The stable or control configured aircraft utilizes controllable winglets to generate pitching, yawing, and rolling moments in flying wing or tailless airframe configurations which are preferably of a swept forward style.

3 Claims, 10 Drawing Figures

FIG. 3a RIGHT SIDE

FIG. 3b LEFT SIDE

FIG. 5 SECTION 3-3, FIG.4

FIG. 4 VIEW 2-2, FIG.1

FIG. 6 SECTION 4-4, FIGS. 4 & 5

FIG. 7 SECTION 5-5, FIGS. 4 & 5

AIRFRAME DESIGN

BACKGROUND OF THE INVENTION

An aircraft (heavier than air vehicle) can be perceived as a two stage energy conversion vehicle. The first stage converts thermal energy to potential energy (altitude). The second stage is the conversion of potential energy to knietic energy (motion). The power source converts the thermal energy to potential energy. The airframe is responsible for converting the potential energy to kinetic energy. Sailplanes, for example, represent the epitome of the potential to kinetic energy conversion process. The efficency of the potential to kinetic energy conversion is measured by the glide angle of the airframe. That is, for a given altitude how far will the airframe go before landing? It can be understood that the airframe that generates lift with the lowest amount of fluid dynamic drag will go the farthest. With careful engine addition, the airframe retains most of its efficiency.

Fluid dynamic drag consists of three parts; parasitic drag (skin friction, profile, and various interference components), induced drag, and trim drag. Two of these drags have received considerable attention. Historically, a great deal of attention has been paid to parasitic and induced drag, but relatively little attention has been paid to reducing trim drag. Herein, trim drag is considered to be the energy consumed by an airframe in flight as needed to sustain balance in level flight or attitude in accelerated maneuvers (i.e. turns, pullouts, aerobatic maneuver, etc.). It is the intent of this invention to provide unique means of trim drag reduction.

This invention relates to airframes and particularly to airframes of the single wing, flying wing, and/or tailless wing type, or in other words, to the class of airplanes in which the functions of the usual tail structure or empennage are accomplished by structures attached to or incorporated within the outlines of the main supporting airfoils. It is to be recognized that whereas this invention relates to airframes, said invention is applicable to both powered and unpowered aircraft. For the purpose of discussion throughout this patent application including claims, the term "tailless" is used to include flying wing or tailless wing airframe configurations.

Airframes of the tailless wing type have heretofore been proposed and constructed with the idea that airframes of this type avoid undue aerodynamic drag so that the efficiency of the airframes would be improved. In such airframes of the tailless type, it has been found that a high degree of longitudinal stability might be attained, but such stability in a longitudinal sense has, however, been attained in the prior airplanes of this type only through inefficient means which have reduced the overall efficiency of such airplanes so as to render tham undesirable in a commercial sense. Energy consumed for lateral and rolling control have similarly been excessive relative to conventional airframe configurations with an empennage.

Specifically, the aforesaid longitudinal stability has been obtained by means that have generated excessive trim drag. The excessive trim drag in tailless type airframes has been the result of either two individual primary causes or a combination of these two primary causes. One, reflex cambered (stable) airfoils that can provide longitudinal stability through aerodynamic generated nose up pitching moments but at the expense of limited maximum lift coefficients relative to those lift coefficients available through unreflexed (unstable) airfoils have been used. The limited maximum lift coefficient can be recognized as a trim drag penalty necessary for longitudinal stability. This cause of excessive trim drag is most common in unswept tailless type airframes.

The other primary cause of trim drag is most common in aft swept tailless aircraft. It is the result of a downward acting balancing force (negative span loading) near the outboard wing tips aft of the center of gravity for the purpose of providing longitudinal stability. In order for the aft swept type of flying wing to maintain level flight, the primary lift of the wing must equal to the weight of the airframe plus the magnitude of the downward acting, balancing force. Therefore, more lift is generated than is actually necessary to sustain flight. The extra lift generates extra drag, i,e, trim drag. NASA reports NASA-TN-D-8260 and NASA-TN-D-8264 demonstrate that the use of winglets reduce induced drag when properly applied to a wing by increasing the span loading in the outboard portions of the wing and by lift forces generated directly upon the individual winglet by the wing tip vortex.

U.S. Pat. No. 4,245,804 issued to Mr. Ishimitsu on Jan. 20, 1981; U.S. Pat. No. 4,240,597 issued to Mr. Ellis, Mr. Gertsen, and Mr. Conley on Dec. 23, 1980; U.S. Pat. No. 4,205,810 issued to Mr. Ishimitsu on June 3, 1980; U.S. Pat. No. 4,190,219 issued to Mr. Hackett on Feb. 26, 1980; and U.S. Pat. No. 2,576,981 attest to the feasibility and desireability of using a fixed airfoil at the end of a wing for the combined purpose of generating a force and controlling wing span loading in a manner so as to reduce airframe induced drag.

In a tailless airframe, further benefits maybe realized. U.S. Pat. No. 2,474,585 teached the use of a rotatable vertical wing-tip panel for generating drag sufficient to overcome engine out yaw. It is the intent of the herein disclosed invention to teach that non-planar, airfoil, shaped, wing extensions (winglets) maybe used to stabilize and control a tailless aircraft by utilizing the lift force the winglets individually generate and by utilizing the winglet control over a portion of the outboard wing span left distribution.

Pitch stability and control, as well as yaw and rolling control maybe obtained by the use of controllable winglets properly arranged so as to vary a portion of the wing span lift distribution and the side (lift) force generated by the airfoil shaped winglets which are mounted so that in their normal positions they are able to effect minimum induced drag. Trim drag is significantly reduced relative to conventional aircraft (with tails) and canard configurations because the majority of stability and control functions are assigned to the controllable winglets therein allowing an airframe to be commercially efficient without the trim drag penalties associated with conventional tails and canards.

Winglets, properly installed for induced drag reduction, generate an inboard acting lift force (for a non-planar winglet rising above the wing plane) and generate an increase in wing span lift distribution (whether the winglet descends, is in plane with, or rises above the plane of the wing). In a forward swept tailless airframe, positive (upward) span lift in the outboard portion of each wing panel is necessary for airframe balance. The use of winglets provide a very useful, favorable, and controllable portion of wing span lift distribution working in harmony with the winglet generated lift force. But in an aft swept wing tailless airframe, balance is obtained with a negative (downward) wing span lift distribution. Therefore, the winglet influence on wing span lift distribution is contradictory to the desired use of the winglet for simultaneous minimum induced drag. Therefore, while winglets for control of aft swept tailless aircraft maybe used, the preferred minimum induced drag configuration is the forward swept tailless aircraft.

Though there are diminishing returns, one or more winglet wing extensions at varying cant angles (including in wing plane) maybe used to influence the wing span load distribution. The preferred arrangement consists of two winglets extending from each wing tip.

Accordingly, it is an object of this invention to provide a substantially non-planar tailless type airframe configuration which exhibits improved aerodynamic efficiency with respect to trim drag. Higher lift coefficient producing airfoils (typically unstable, i.e. nose down pitching moment) and high lift devices such as trailing edge flaps maybe used. Suitable choices of the variables within the concept of the invention allow for flight at supersonic as well as subsonic velocities.

SUMMARY OF THE INVENTION

This and other objects are achieved in accordance with this invention by the use of winglets, similar but not limited to those described in NASA-TN-D-8264 dated 1976, to be used as controllable surfaces or containing controllable surface for generating lonitudinal balance forces, rolling moments, and yawing moments in tailless wing aircraft regardless of wing sweep angle.

The preferred configuration for this invention is the forward swept tailless wing. Therein, the balance force for longitudinal stability is acting upward as it is forward of the center of gravity. Since the balance force is forward of the center of gravity (which, in turn, is forward to the primary lifting force of the airframe), only a magnitude of total lift essentially equal to the weight of the airframe in flight is ncessary, hence minimizing trim drag. Further, use of winglets has been demonstrated by NASA-TN-D-8264 as being capable of reducing total airframe drag. Therefore, removing the empennage from the conventional airframe, sweeping the wings forward, adding winglets, and assigning specifically but not necessarily only pitch control to them is capable of producing flight with reduced trim drag.

The objectives of this invention are further achieved by choosing a wing configuration whose combination of sweep and dihedral are selected so as to minimize spanwise airflow. Not only is a wing of finite span with constant dihedral and/or constant swept included in said minimization but dihedral that varies with span; and/or sweep that varies with span (The mathematical equation of which, is of degree greater than one.) are included. A specific example would be an elliptical dihedral distribution such that the greatest rate of dihedral change occurs in the outboard portions of the wing panel. Controlled spanwise flow increases winglet effectiveness, hence adding to the trim drag reduction.

BRIEF DESCRIPTION OF THE DRAWINGS

Other objects and advantages of this invention will be apparent to one skilled in the art after a reading of the following description with reference to the accompanying drawings in which.

DETAILED DESCRIPTION

Figure 1:
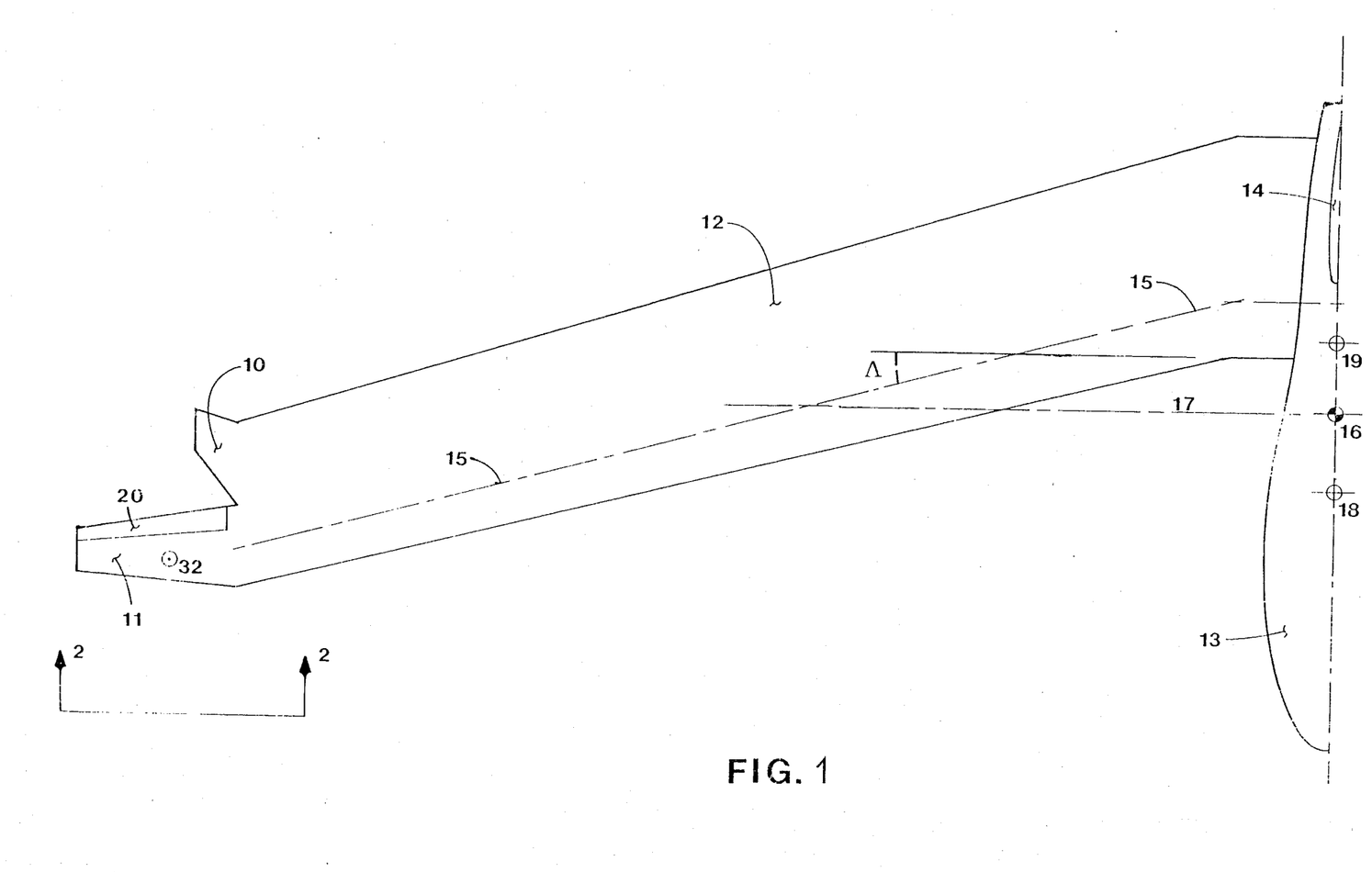
FIG. 1 is a plan view of an airframe constructed in accordance with this invention.

In the form of the invention chosen for disclosure herein, the invention is embodied in an airframe of the tailless, monoplane type having a forwardly projecting fuselage 13, FIG. 1, disposed midway between the ends of a cantilever wing structure 12. The substantially rigid wing structure 12 of the airframe is preferably such as to provide a forward sweep throughout at least a portion of its extent, or in other words, the outer ends of the wings are disposed forwardly of the root portions thereof.

The preferably forward swept, tapered wing plan, such as the examples shown in FIGS. 1, 2, 8, and 9 is constructed so that the locus of the centers of pressure 15 of each wing 12 lies in advance of the center of gravity 16 at the outer portions of the wings and lies aft of the center of gravity at the inner portions of the wings. Thus line 17 indicates the longitudinal position of the center of gravity as is substantially located at the plane of airframe symmetry.

A vertical fin 14 preferably without rudder structure is mounted at the rear portion of the fuselage substantially at the airframe longitudinal plane of symmetry. The fin's primary purpose is that of providing yaw stability as opposed to yaw control. Specifically, the fin 14 is sized and located usch that the stability derivative $C_{n\beta}$ is preferably positive.

Figure 2:
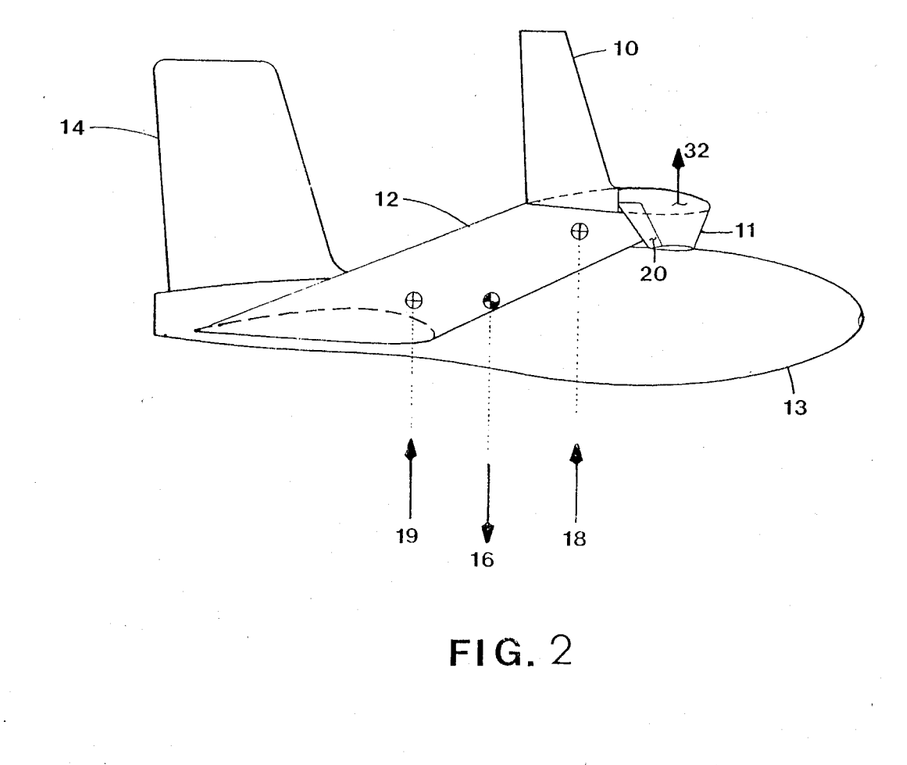
FIG. 2 is a side elevational view of the airframe of FIG. 1.
Figure 3A:
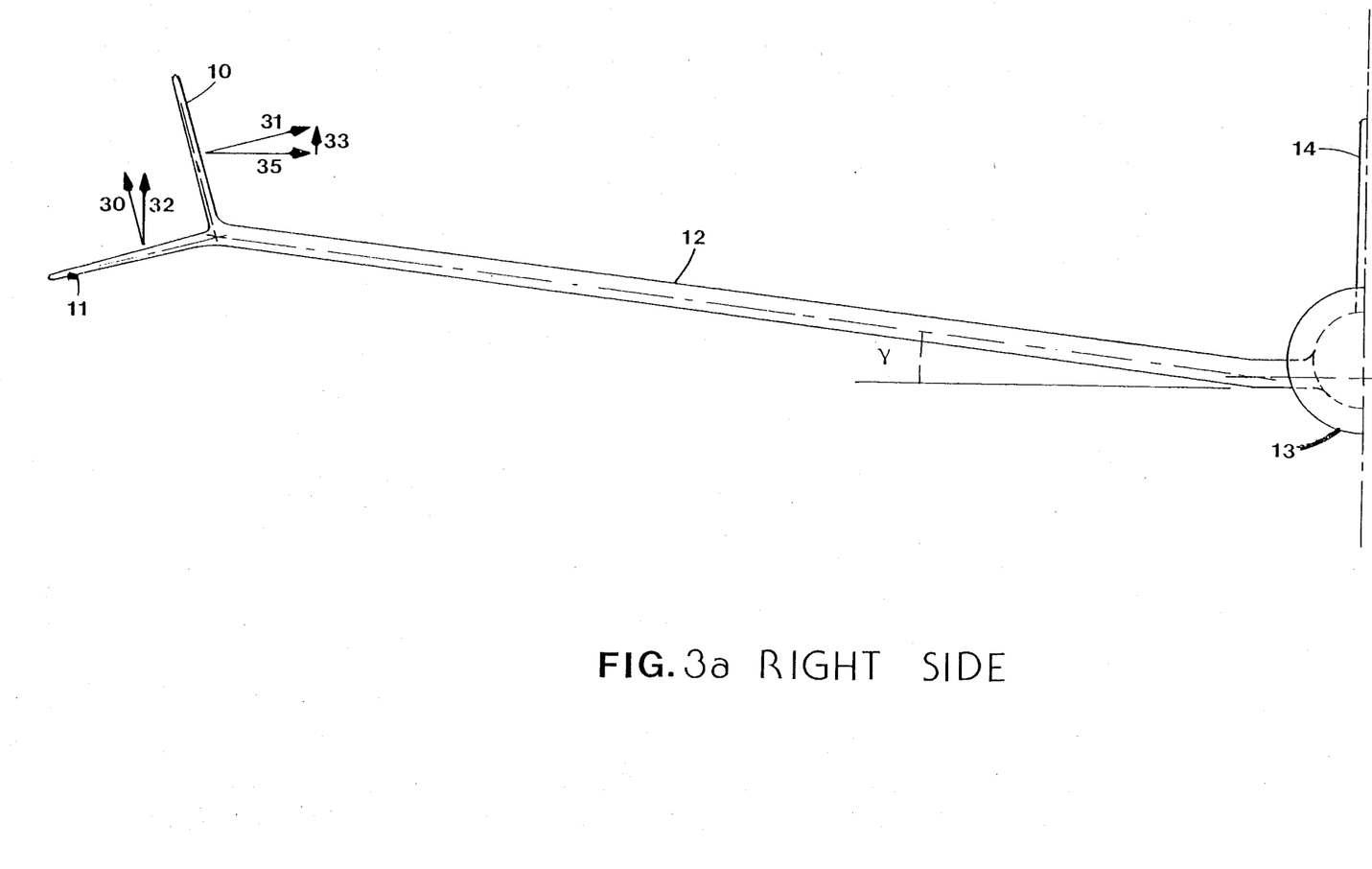
FIG. 3 is a front elevation of view of the airframe of FIG. 1.
Figure 3B:
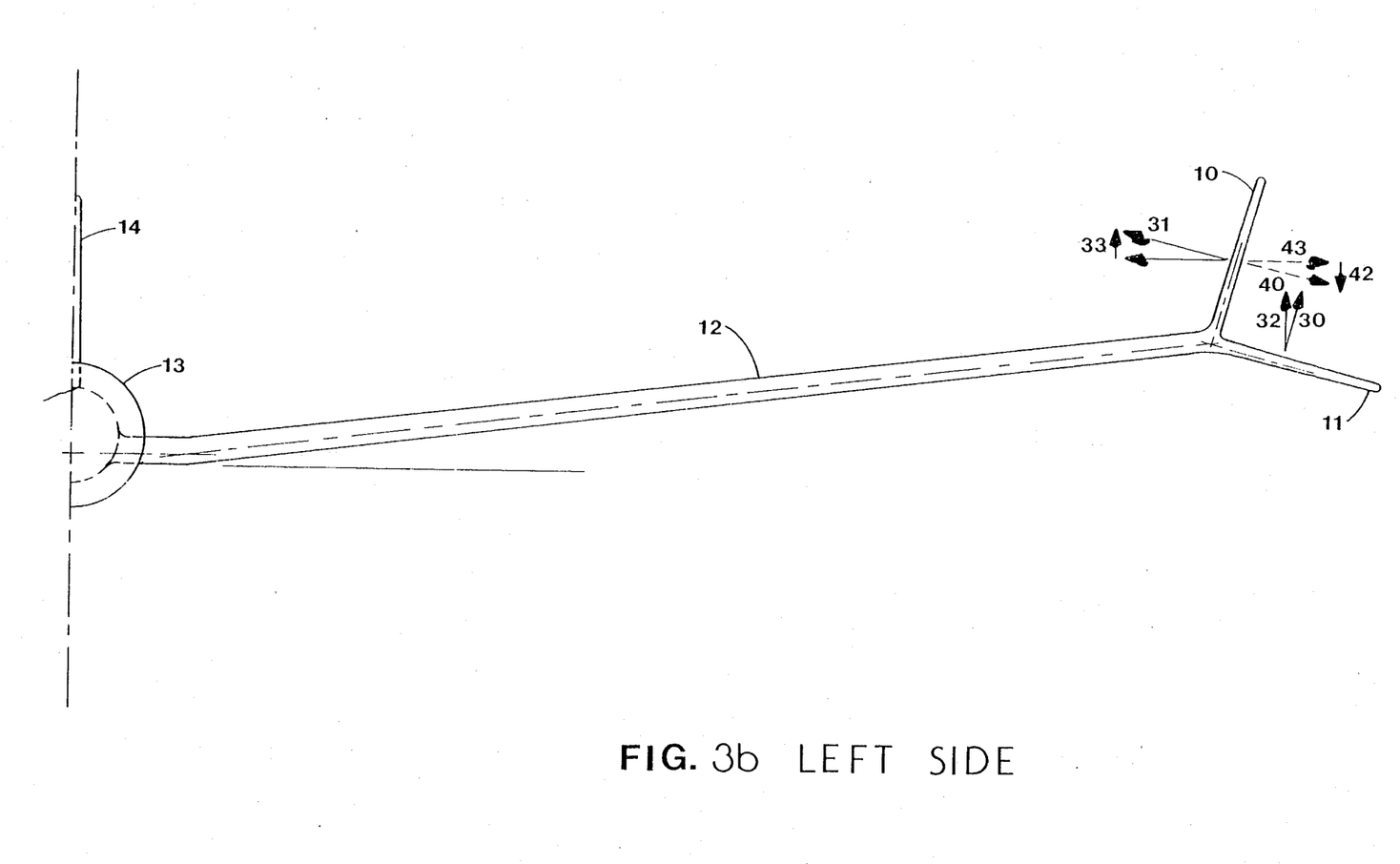
Figures 4, 5:
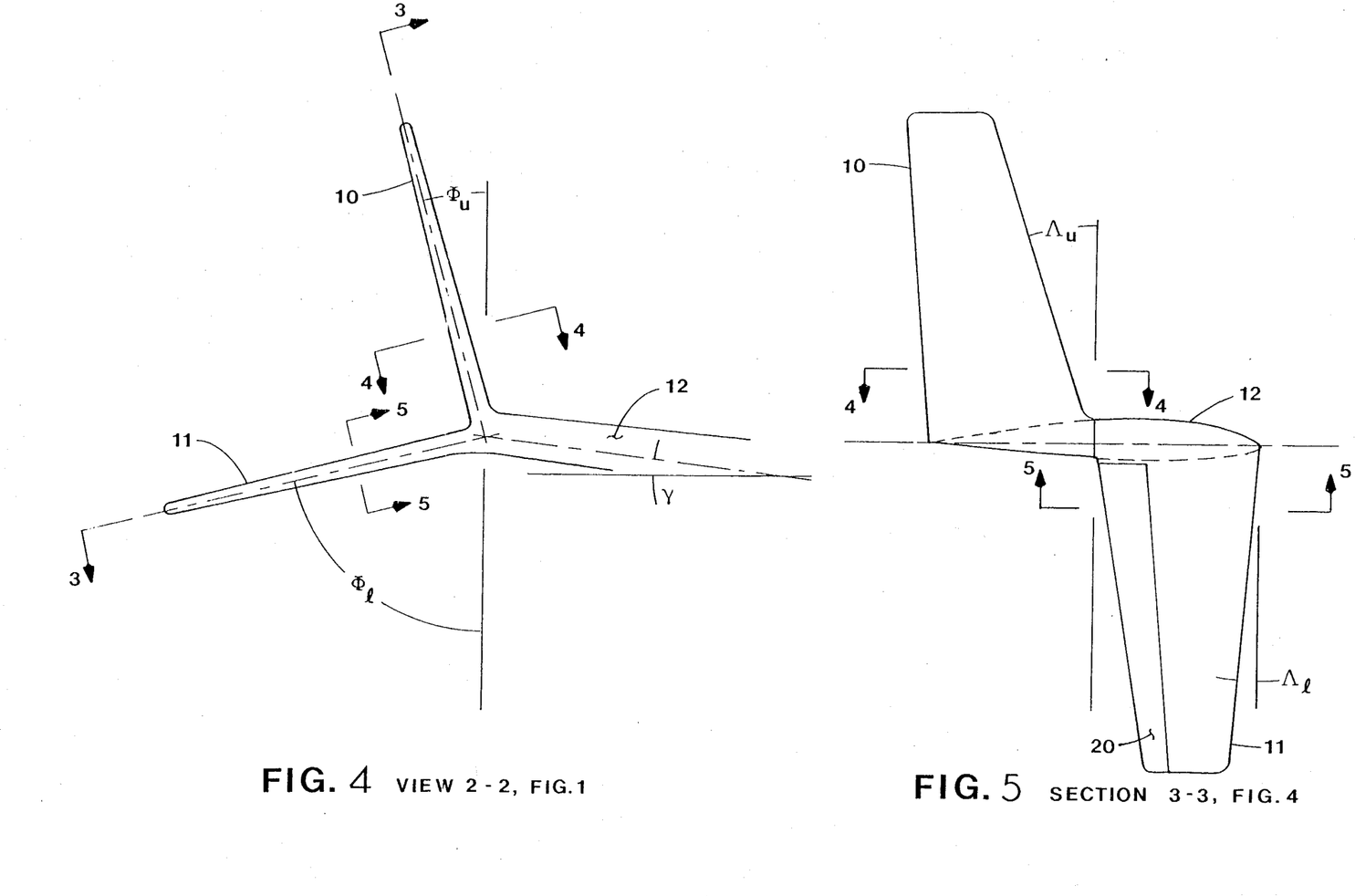
FIG. 4 is an enlarged front elevational view taken from generally along view 2—2 of FIG. 1.
FIG. 5 is a plan view from generally Section 3—3 of FIG. 4.

Referring now to the FIGS. 1, 2, 3, 8, and 9, the winglets 10 and 11, fixed with controllable surface or rotatable by rotation means not shown, of this invention form an extension of the wing 12 so as to provide a non-planar wing geometry having a portion of the tip section, such as winglet 10, that projects upwardly and that in the preferred embodiment of FIG. 4, though not limited therein, projects outwardly. Further, an additional portion of the tip section, such as winglet 11, projects downwardly and that in the preferred embodiment of FIG. 4, though not limited therein, projects outwardly.

The cant angles $\Phi_u$ and $\Phi_l$ of the upper winglet 10 and lower winglet 11, FIG. 4, and the sweep angles $\Lambda_u$ and $\Lambda_l$, FIG. 5, of the upper and lower winglets, 10 and 11 respectively, are determined by the mission profile of each airframe design application. Winglet geometric characteristics such as span, area, area distribution, incidence, twist, and thickness may also be influenced by mission profile. An example list of mission profile parameters would non-exclusively contain velocity, stability, and wing geometry. High subsonic velocities and supersonic velocities require consideration of compressibility. The use of winglets for airframe stability and/or control allow the designer a significant range in which to tailor stability derivatives and control transfer functions about any/or all of the three stability axes. The said range extends from conventional static stability to control configured stability such as used in some military applications. Wing geometry, non-exclusively consisting of items such as sweep and dihedral influence spanwise pressure distribution, hence spanwise flow, thereby influencing the flow field in which the winglets are operable.

For the example shown in the FIGURES: $\Phi_u=15$, $\Phi_l=75$, $\Lambda_u=18$, $\Lambda_l=5$, upper winglet 10 span=the tip chord, $C_t$, lower winglet 11 span=$C_t$ and the total winglet area=10% of the total wing area.

Figure 6:
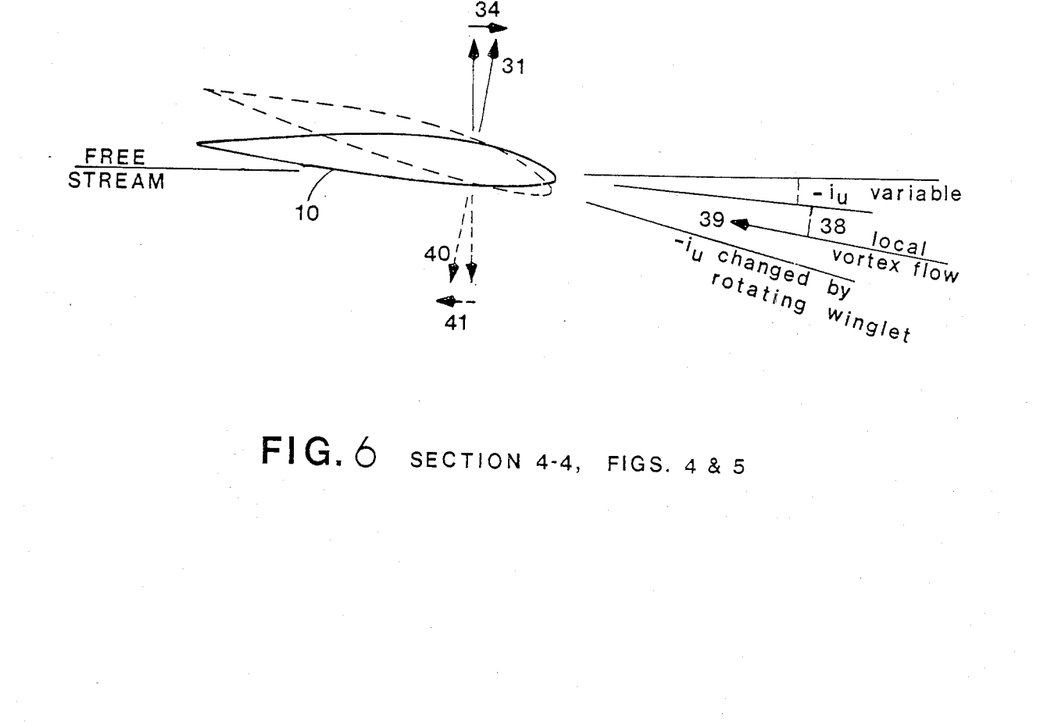
FIG. 6 depicts a streamwise airfoil section typical of the upper winglet at Section 4—4 of FIGS. 4 and 5.
Figure 7:
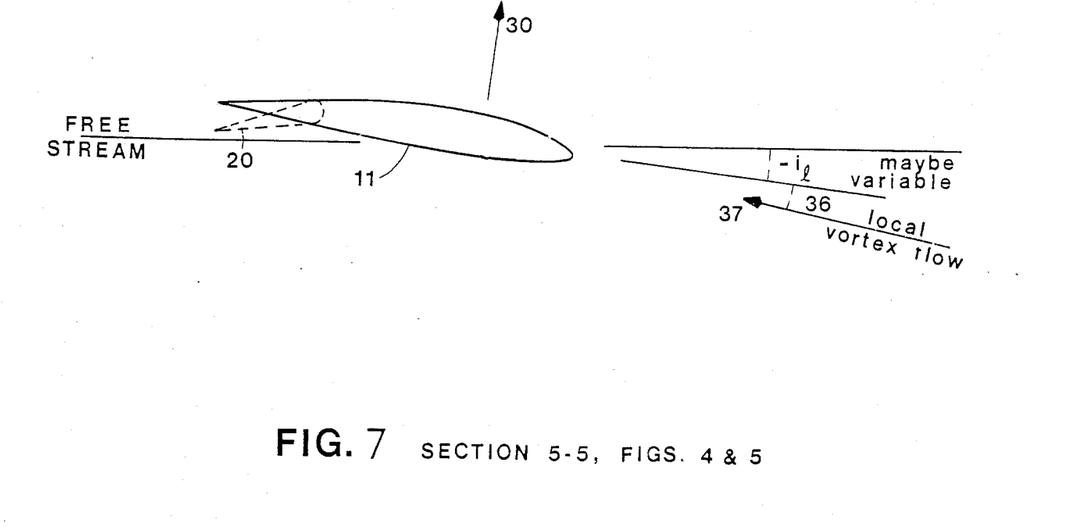
FIG. 7 depicts a streamwise airfoil section typical of the lower winglet at Section 5—5 of FIGS. 4 and 5.

The initial incidence $i_u$ and $i_l$ of the upper and lower winglet FIG. 6 and FIG. 7 respectively are set so as to obtain minimum total airframe induced drag at some desired flight condition, usually cruise condition. It is to be observed that the trim drag produced by the use of winglets for control is reduced by the amount of airframe, induced, drag reduction generated by the winglets during a given particular flight condition.

In accordance with this invention the winglet incidences $i_u$ and/or $i_l$ maybe variable by operable means not shown. Further, the winglet camber maybe changed by means such as a moveable surface 20, as shown in FIGS. 5 and 7. Variable winglet incidence and/or camber allow the aerodynamic force vectors 30 and 31, FIGS. 3, 6, and 7, and the wing 12 span air load distribution to be varied so as to generate useable, variable resultant forces and moments in pitch, yaw, and roll directions. It maybe observed from the figures that a multitude of winglet incidence, cant, and/or camber combinations exist that are potentially useful and allowed within the nature of this invention.

The airframe as chosen for illustration of the embodiment of the invention derives pitch stability and balance from the lower pair of winglets 11 through control of $i_l$, FIG. 7, with operable means not shown. Pitch control is derived from the moveable surface 20, FIG. 7. Coupled yaw and roll are obtained by the upper winglets 10 through control of $i_u$, FIG. 6, with means for independent rotation of the upper winglet on the tip that is toward the desired direction of rotation. Such operation minimizes adverse yaw trim drag penalties Roll control, substantially independent from yaw unless some degree of coupling is desired, is obtained from differential movement of the moveable surfaces 20 mounted on the lower winglets. It maybe observed that the cant angles $\Phi_u$ and $\Phi_l$ FIG. 4 and wing dihedral $\gamma$, FIGS. 3a and 9 significantly influence rolling moments and as a result yaw and roll coupling.

FIGS. 1, 2, and 3 illustrate arrangement of the significant forces involved in the horizontal sense. Given a resultant upward acting lifting force 19 of the locus of the centers of pressures 15 aft of the center of gravity 16, horizontal balance may be provided by a resultant 18 upward acting force. The winglets 10 and 11 contribute to the resultant 18 by increasing the vertical magnitude of the spanwise lift distribution in the portions of the wing panel forward of the center of gravity 16 toward the wing tips, similar to that substantiated by NASA TN-D-8260; and by the upward components 32 and 33, FIG. 3 of the aerodynamic force vectors 30 and 31 generated by and acting upon the winglets. (For the sake of clarity and because the variable wing span lift distribution directly influenced by the winglet, and the forces generated directly upon the winglet act in harmony with each other, the vector forces shown upon the winglets are presumed to include both span lift and direct force influences.) Aerodynamic force 30 is obtained by choosing an initial $i_l$ such that the lower winglets 11, FIG. 7, have a positive angle of attack 36 with respect to the local vortex flow 37. Variation of the upward lift components 32 of 30, FIG. 3, by varying incidence $i_l$ is herein used for primary airframe aerodynamic balance in non-maneuvering flight and static stability. Variation of the upward lift 32 by camber changing techniques such as, but not limited to, the moveable surface 20 is used primarily for maneuvering flight path control. It can be observed that deflection of the moveable surfaces 20 at each wing tip in the same direction generates a pitching moment while deflection of one tip surface 20 in an opposite sense to that of the surface 20 at the opposite tip generates a rolling moment. Longitudinal static stability, or more particularly a negative $C_{m\alpha}$ stability derivative is obtained by, though not limited to, choosing the geometric variables of winglets 11 and winglet incidence $i_l$ such that the rate of lift coefficient increase with angle of attack decreases much more rapidly than that of wing 12 ultimately stalling before the wing. Severe stall characteristics are minimized as winglet upward lift components are a relatively small portion of the wing lift that is generated forward of the center of gravity. Favorable stall characteristics may be further improved by choosing winglet airfoils that have gentle stall characteristics. It is to be further observed that with suitable sensing and means operable that winglets in general and particularly winglets 11 herein maybe used for wing gust load allevation.

It is evident from the FIGURES in general that the variation of a variety of winglet force vector components and combinations of components are capable of providing yawing, rolling and pitching moments dependent upon such items as wing sweep and dihedral, winglet geometry, cant angles, and incidence angles.

In the preferred embodiment of the invention coupled yaw and roll are obtained by variation of suitable components of the aerodynamic forces 31, FIG. 3. Aerodynamic force 31 is obtained by choosing an initial $i_u$ such that the winglets 10 have a positive angle of attack 38, FIG. 6, with respect to the local vortex flow 39. Then, in flight, control forces are generated by variation of the incidence $i_u$ by means controllable of the upper winglets 10. It is to be observed that said force variation could also be generated by camber changing. FIG. 6 illustrates that as the upper winglet is rotated leading edge outward, $i_u$ becoming more negative, force 34, a component of force 31 in the direction of motion, is reduced and eventually reversed yielding a strong yawing moment because the corresponding force on the opposite wing tip has remained substantially unchanged. The broken line airfoil in FIG. 6 represents the outward rotation of the upper winglet 10 which generates aerodynamic forces 40, substantially opposite in direction to force 31, and force 41 which acts substantially opposite to 34. Hence a large yawing couple can be generated in the direction of choice by rotation of the upper winglet on the wing tip that is toward said direction. The phenomena of adverse yaw is substantially eliminated by a rolling moment that is also present with the rotation of the upper winglet. The dashed line force 42, FIG. 3, a downward component of said force 40, illustrates the force that, together with the upward force 33 on the opposite wing tip, generates a rolling moment. Also, the horizontal components 35 and 43 generate a rolling moment. Both said rolling moments are favorable coupled with the said yawing moment for as seen in FIG. 3 outward rotation of the left winglet 10 (pilots reference) generates a coordinated turn with bank to the left. The influence of winglet geometry and wing dihedral on the magnitude of coupling and on the magnitude of moments generated is readily apparent in FIG. 3.

Substantially uncoupled rolling moments may be generated by the lower winglets through differential deflection of the moveable surfaces 20 as previously noted. A substantially uncoupled yawing moment may be generated by rotating the fin 14 and/or the use of a rudder attached to the fin.

Two significant variations of the illustrated preferred configuration of two non-planar winglets concern the number of winglets and their cant ($\Phi$) angles.

First, no limit is placed on the number of winglets. Second, no limit is placed on cant angle. A winglet may actually be in-plane with the wing. While practical considerations would require consideration of interference effects, the winglets derive their useful effects primarily from the wing tip vortex which is substantially circular in cross section. The axis of the circle is substantially parallel to the wing tip chord axis, therefore, winglets extending in almost any radial direction can have beneficial wing span lift contributions.

Figure 8:
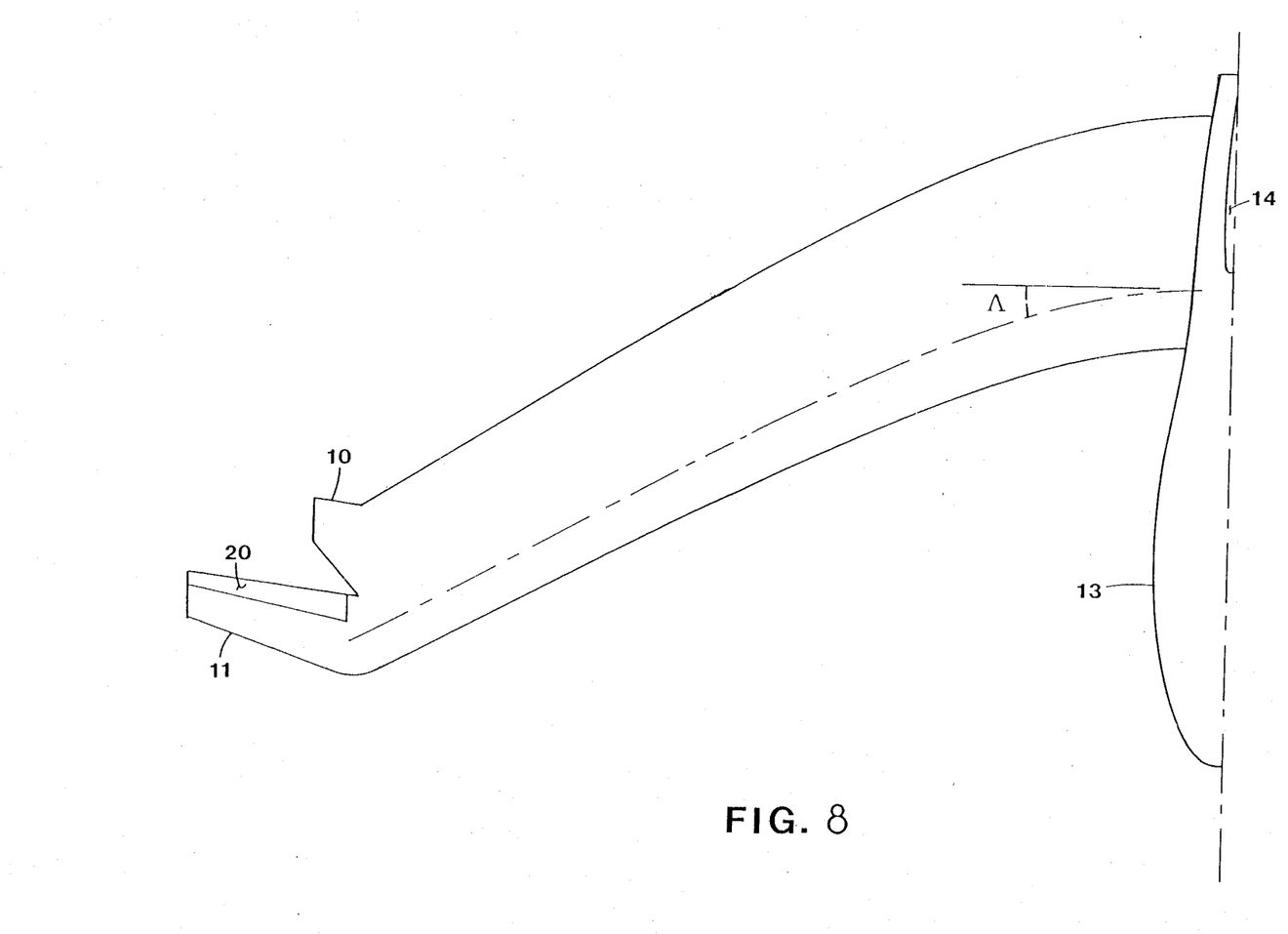
FIG. 8 is a plan view of an airframe with hyperbolic sweep constructed in accordance with this invention.
Figure 9:
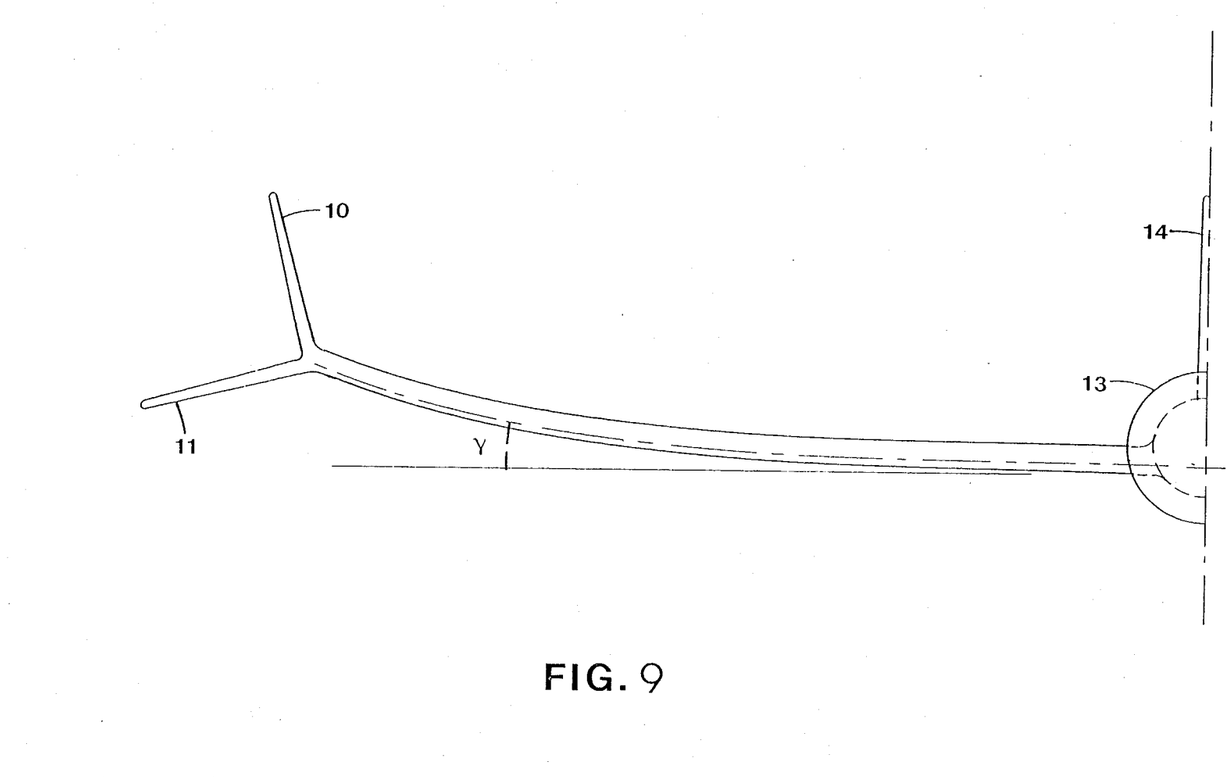
FIG. 9 is a front elevation view of an airframe with elliptical dihedral in accordance with this invention.

The winglets influence the spanwise flow of air and are influenced by said flow. Winglets are most effective at minmizing induced and trim drag when the dihedral, $\gamma$, FIGS. 3a and 9, and forward sweep, $\Lambda$, FIGS. 1 and 8, are chosen so as to minimize the spanwise flow of air on the wing. It is, therefore, in further accord with this invention to allow higher order (in mathematical sense) variation of dihedral with span; and/or forward sweep with span for finite length wings. The second order curves of the conic family are examples. FIGS. 8 and 9 illustrate the embodiment of this invention incorporating hyperbolic sweep and/or elliptical dihedral. The forward sweep as illustrated in FIG. 8 has the greatest rate of curvature inboard. The dihedral as illustrated in FIG. 9 has the greatest rate of curvature outboard. The preferred directions are forward sweep and upward dihedral.

However, because there is aerodynamic benefit in controlling the spanwise movement of air in any airframe configuration with or without winglets; variation of dihedral with span and variation of sweep with span by equations whose mathematical order is greater than one or are also considered to be a part of this invention.

It should further be recognized that with proper sensing not illustrated, that the winglets maybe used for wing gust alleviation by being deflected in harmony with a gust so as to create forces that load the wing in opposition to gust loads.

Linear translation of the airframe in the vertical or horizontal directions without airframe pitching or yawing rotations as in control configured flight vectoring maybe accomplished by simultaneous use of the winglets forward of the center of gravity deflected in harmony with wing and fin in-plane control surfaces aft of the center of gravity.

The embodiments of the invention in which an exclusive property or privilege is claimed are defined as follows:

1. An airframe of the flying wing configuration comprising:
  a swept forward wing with controllable wing tip extensions extending into the wing tip vortices at the ends thereof, said wing tip extensions comprising a first, downwardly extending winglet located forwardly of a spanwise wing centerline, a second, upwardly extending winglet located rearwardly of a spanwise wing centerline, said first and second winglets being independently controllable about a chordwise axis, said first and second winglets being further independently controllable about an axis extending spanwise of said winglets, wherein said winglets consitute the primary control of pitch, roll and yaw of said airframe.

2. The airframe of claim 1 wherein the wing tip extensions have control response rates sufficient to be used to supply substantially uncoupled forces for the purpose of gust alleviation.

3. The airframe of claim 1 wherein the wing tip extensions may be used in concert with other controls so as to accomplish lateral or vertical airframe translation without rotation.

* * * * *